Patented Dec. 28, 1937

2,103,495

UNITED STATES PATENT OFFICE 2,103,495

PROCESS FOR THE PRODUCTION OF VALUABLE SUBSTANCES

Hans Ruckdeschel, Kulmbach, Germany, assignor to the firm Ireks Aktiengesellschaft, Kulmbach, Germany, a joint-stock company of Germany No Drawing. Application May 29, 1935, Serial No. 24,057. In Germany May 8, 1934

9 Claims. (Cl. 99—27)

On heating hexoses or substances containing hexoses with albumen decomposition products, such as peptides and amino acids or substances which contain such albumen decomposition products, there are formed palatable compounds of the hexoses with the albumen decomposition products which have an aroma of malt. Such compounds are also obtained by heating solutions of the said substances, for example in water or in aqueous liquids, to a temperature of 100° C. and above this. The products obtained are used in many ways in industry for the manufacture of preparations for nutritive and seasoning purposes and for promoting fermentation and the like. The process which forms the subject matter of the present invention differs from the known processes of this kind by the employment or co-employment of pentoses and pentose compounds or substances and preparations which contain pentose or pentose compounds. Thus, in the industrial application of the invention, pentoses, namely xylose and arabinose, polypentoses, i. e. products intermediate between pentoses and pentosans produced by the polymerization of pentoses, reverted pentoses, i. e. products intermediate between pentoses and pentosans produced by breaking down pentosans, and other pentose compounds come chiefly into consideration, and further as partial substitutes for these, trioses such as glycerine aldehyde, dioxyacetone, and the like which, like the pentoses, very easily form compounds with albumen decomposition products, and in some cases even at the ordinary temperature.

All substances which contain such albumen decomposition products either naturally or owing to the way in which the albumen-containing starting material is treated and have a composition and properties which are otherwise suitable for the manufacture of the final products can be used for the process in accordance with the invention. Particularly suitable are substances which either contain or produce in the course of the process of the invention albumen decomposition products and are rich in yeast plasm, for example, yeast itself or yeast which has been liquefied with sugar, salt or the like. The yeast and the preparations obtained from it can be partly substituted by other albuminous substances or substances rich in albumen, for example soluble albumen from milk, acid skim milk and whey, soya albumen meal, malt germs and malt germ extracts and the like. The term "malt germs" is to be understood to mean the sprouts or rootlet removed from barley which has been allowed to germinate. Also malt or malt products such as malt mashes, malt worts, malt extracts, beer worts and beer which in addition to albumen decomposition products also contain sugar, can be used in the process of the present invention. For the purpose of increasing their content of albumen decomposition products, substances which contain or produce the aforesaid materials can first be subjected to fermentation in aqueous solutions or mixtures, for example to a lactic acid fermentation, or to an acetic acid fermentation or to a mixed lactic acid and acetic acid fermentation by means of yeast bacteria which produce lactic and acetic acid, or to an alcoholic fermentation.

The lactic acid fermentation can be replaced by an addition of a nutrient acid, for example fermentation lactic acid, with or without the addition of fermentation acetic acid, citric acid, tartaric acid or the like. Thus, for example, if the liquid starting material is acidified with these acids and heated, albumen decomposition products can be formed, the enzymes present co-operating in some cases.

The alcoholic fermentation can be replaced by an addition of a liquid rich in sugar and albuminous materials which has been fermented to a greater or less extent by means of yeast.

The reaction between the albumen decomposition products and the pentoses proceeds at the ordinary temperature. This is of importance in many cases because the changes effected in the product by the heating, namely the destruction of the enzymes in the material to be treated, can be avoided. Nevertheless, in this case the starting material requires to be stored for a longer time. The process of the reaction is accelerated by means of the processes which take place during the acid and alcoholic fermentation. Usually, however, a moderate heating of the starting material to about 40–50° C. and above this is advisable or necessary for accelerating the reaction. When the finished product is not required to contain enzymes and no other detrimental changes are produced by heating to an elevated temperature, then the starting material can be heated to 100° C. or even somewhat above this temperature. Further, one part of the material may be heated in this way and another part may not be heated at all or may only be heated to temperatures at which the enzymes are not harmed, so that the final product is particularly rich in materials of malty aroma and nevertheless contains enzymes.

The invention and the technical uses to which it can be put will now be explained with the aid of the accompanying examples.

*Example 1.*—To 20 kg. of pressed, pure-tasting yeast having a content of about 15-30% of dry material are added 5 kg. of xylose and 5 kg. of dextrose syrup (starch syrup or glucose) and the whole is heated to about 50° C. Liquefaction occurs in a few minutes. This temperature is held for some minutes and the mixture is then allowed to cool. There is formed a yellowish to brownish coloured syrup having an agreeable smell and taste which continually improves as the time during which it is kept at room temperature increases. Even after being stored for two weeks the taste of yeast has completely disappeared and is replaced by a delicate fruit-like smell and taste which is extremely reminiscent of malt sweetmeat. If it is important that the constituents of the liquid should be changed as little as possible then it is sufficient merely to store the product for some time in order to effect the reaction between the pentose and the albumen decomposition products and to obtain an aromatic palatable product.

The change can be accelerated if a weak acid fermentation is initiated by inoculating the materials with acid bacteria, for example lactic acid bacteria.

Further, the mixture of yeast and sugar can also be heated to 40-60° C. for a period of ½ hr. or longer if it is not a disadvantage, by reason of the purpose for which it is to be employed, to have a darker coloured product. In this case also the taste and aroma of the reaction product becomes more delicate and pronounced if the liquid obtained is stored.

Owing to its agreeable taste and aroma, to its high enzymatic power, its richness in vitamins and its nutritive value, the thin syrup can be used as a diatetic food and as an addition to foods, for example to confectionery, baked goods, sweetmeats and the like, and it can also be used, owing to its action in promoting fermentation, as an assistant in baking, for example in making white bread and other baked products and further as an addition for use in the manufacture of malt and beer.

When the aforesaid mixture of 20 kg. of yeast, 5 kg. xylose and 5 kg. starch syrup or malt extract or sugar syrup is heated to 90-100° C. there is obtained a considerably darker product having a chocolate-brown colour which is viscous and is extremely palatable and can also be used for the purposes already indicated. An addition of ½ kg. monocalcium phosphate or ½ kg. tartaric acid before the heating gives the product a particularly pleasing flavour.

If necessary, the syrup may be converted into a powder form before use by vacuum or roller drying or drying by atomization or by the addition of substances which take up water. In this case and also in the manufacture of concentrates the reaction between the albumen decomposition products and the pentoses is promoted and accelerated by the heating which takes place. The concentration is effected, if the enzymes and vitamins are not to be injuriously affected, at a temperature which does not exceed 60° C. or otherwise at a higher temperature.

*Example 2.*—For the manufacture of a malt having a strong aroma there is employed for example 1% xylose calculated on the air-dried malt. The pentose or pentose solution can be sprayed on the green malt or the malt which has already been dried or completely kiln dried can be treated with the pentose solution and then subjected to a treatment by warmth or heat, for example in closed drums. According to the colour and aroma which it is desired that the malt should have, the warming or heating treatment is carried out at a lower or higher temperature, for example at a temperature of 50, 70, 90 or 110° C. or at a higher temperature and, in some cases, may take place in stages. Also the duration of the heat treatment depends on the degree of colour and aroma desired.

According to the effect desired and the method employed, namely the temperature, the quantity of pentose may be increased or reduced. In general, the quantity of pentoses lies between the limits of 0.1-10% calculated on the malt.

In the case of malts which have undergone a longer albumen decomposition at 30-50° C. before the kiln drying, a troublesome albumen taste often occurs and becomes noticeable on stronger drying. A distinct improvement in the taste can already be obtained by the addition of only ½-1% of xylose calculated on the quantity of malt and in this case the completion of kiln drying can be undertaken at very moderate temperatures, in which case the enzymes are maintained to an increased extent.

Instead of pure pentoses and pentose solutions, mixtures of malt germs, or malt germ extracts prepared in known manner, with pentose solutions can be used. For example, 0.5 kg. malt germs can be mixed with 0.3-0.5 kg. pentose, or pentose solution having a corresponding content of pentose, and so much water added that the malt germs are covered. The temperature of the water may be from 20-100°. The malt germs are allowed to stand covered for some hours, they are then pressed and this solution is combined with ½-1 hundredweight of air-dried malt and the malt is thereafter dried at a suitable temperature.

Also liquids containing yeast or yeast plasm can be previously brought together with pentoses and then added to the kiln dried malt. For example 1 kg. pressed, washed beer yeast is mixed with 0.5 kg. xylose whereby liquefication occurs. The mixture can be filtered, diluted with water and added to ½-1 hundredweight of malt which has been slightly kiln-dried at a low temperature, in which case a subsequent drying at a suitable temperature is effected. The malt germ-pentose or yeast-pentose mixture can also be subjected to a heat treatment before being combined with the kiln dried malt, for example to heat treatment at 50° C. of a duration of 1-5 hours or at 90-100° C. for ¼ hour or longer, according to the aroma and colour which it is desired that the final product should possess. If a yeast-pentose mixture or a malt germ-pentose mixture prepared in this manner is added to an air dried green malt, or a malt which has been lightly dried at a low temperature, then the kiln drying can be completed at a very low temperature and a malt having a powerful aroma and high colouring power and rich in enzymes and extract is obtained. In this case an excess of pentose may sometimes be added, namely ½-2 kilograms and ½-1 hundredweight of kiln dried malt.

*Example 3.*—If an extract or malt wort prepared from ordinary green or kiln-dried malt be employed as the starting material, then the pentose, or the mixture of pentose with nitrogenous compounds, is employed, in the manner indicated for malt, and, for example, 5-10 kg. xylose are taken per 1 hundredweight of malt worked up into the form of extract. The wort extract can be previously thickened. By means of a subsequent suitable warming or heating treatment of the extract, the formation of aroma and colour formation can be accelerated and can be carried further as desired.

If the product is intended to be used as an addition in the preparation of beer, then vat yeast can be added before the heat or warming treatment and the wort can be subjected to fermentation. A simultaneous acidification by lactic acid bacteria is only to be recommended when the pH value of the mash or wort is to be altered.

In order to obtain a strongly aromatic product having good colouring power, it is sufficient to take care that a quantity of xylose which preferably corresponds to the albumen content of the mixture is employed. The quantity of pentose can be increased but is preferably not reduced in relation to the albumen content.

*Example 4.*—For obtaining low molecular pentosans or poly-pentoses the procedure may be as follows:—10 kg. of desweetened sugar beet slices (the dry slices or pieces of commerce) or the dried residue are heated with 40 litres of water for 3 hours at a pressure of 3 atmospheres in a closed vessel. To each 1 litre of the liquid obtained by pressing there are added 100 grams of pressed, washed beer yeast with a dry substance content of 15% or malt extract or an extract or infusion of malt germs and the mixture is thickened at 50° C. or even at a higher temperature, to form a syrup. Preferably, before the thickening or heat treatment, 2 grams of lactic acid per litre of expressed liquid are added. The product can be used as a substitute for the xylose-sugar-yeast syrup indicated in Example 1, 2 or 3.

I claim:—

1. The herein described process of making a syrup for flavoring, coloring and seasoning purposes, which process comprises the step of reacting a substance containing albumen decomposition products with a substance selected from the class consisting of trioses, pentoses and substituted pentoses.

2. The herein described process of making a syrup for flavoring, coloring and seasoning purposes, which process comprises the step of reacting a substance selected from the class consisting of trioses, pentoses and substituted pentoses, with a substance containing albumen decomposition products and selected from the class consisting of yeast, liquefied yeast, malt, malt mash, malt wort, malt extract, malt germs and malt germ extract.

3. The herein described process of making a syrup for flavoring, coloring and seasoning purposes, which process comprises the step of reacting acid skim milk with a substance selected from the class consisting of trioses, pentoses and substituted pentoses.

4. The herein described process of making a syrup for flavoring, coloring and seasoning purposes, which process comprises reacting a substance containing albumen decomposition products with a substance selected from the class consisting of trioses, pentoses and substituted pentoses, and heating said mixture.

5. The herein described process of making a syrup for flavoring, coloring and seasoning purposes, which process comprises forming a solution containing pentose, adding malt to said solution and heating the resulting mixture to cause a reaction between the pentose and the malt.

6. The herein described process of manufacturing a flavoring, coloring and seasoning preparation, which process comprises forming a syrup by reacting yeast with pentose, diluting said syrup, adding dried malt to said diluted syrup and drying the resulting product.

7. As a new composition of matter, the syrup obtained by the reaction of a substance containing albumen decomposition products with a substance selected from the class consisting of trioses, pentoses and substituted pentoses.

8. The herein described process of making a syrup for flavoring, coloring and seasoning purposes, which process comprises the steps of mixing a substance containing albumen decomposition products with a substance selected from the class consisting of trioses, pentoses and substituted pentoses, and heating the mixture to a temperature between 40° C. and 110° C. to cause a reaction between the mixture components.

9. The herein described process of making a syrup for flavoring, coloring and seasoning purposes, which process comprises the steps of mixing a substance containing albumen decomposition products with a substance selected from the class consisting of trioses, pentoses and substituted pentoses, and heating said mixture to a temperature between 40° C. and 60° C. to cause a reaction between the mixture components.

HANS RUCKDESCHEL.